United States Patent [19]
Kubota et al.

[11] Patent Number: 4,836,165
[45] Date of Patent: Jun. 6, 1989

[54] ENGINE CONTROLLING APPARATUS FOR A WHEELED TYPE CONSTRUCTION MACHINE

[75] Inventors: Yasuhiko Kubota; Shigeyuki Tate, both of Kawagoe, Japan

[73] Assignee: Kabushiki Kaisha Komatsu Seisakusho, Japan

[21] Appl. No.: 138,375

[22] PCT Filed: Apr. 1, 1987

[86] PCT No.: PCT/JP87/00204

§ 371 Date: Nov. 24, 1987

§ 102(e) Date: Nov. 24, 1987

[87] PCT Pub. No.: WO87/05968

PCT Pub. Date: Oct. 8, 1987

[30] Foreign Application Priority Data

Apr. 1, 1986 [JP] Japan .................. 61-75129

[51] Int. Cl.⁴ .......................................... F02M 39/00
[52] U.S. Cl. ................................ 123/357; 123/385; 414/699
[58] Field of Search ............... 123/357, 358, 359, 387, 123/386, 385; 414/699

[56] References Cited

U.S. PATENT DOCUMENTS

| | | | |
|---|---|---|---|
| 4,373,850 | 2/1983 | Durham | 123/386 |
| 4,606,313 | 8/1986 | Izumi | 123/357 |
| 4,638,779 | 1/1987 | Kitada | 123/386 |
| 4,645,146 | 2/1987 | Spriessler | 123/385 |
| 4,709,335 | 11/1987 | Okamoto | 123/357 |

FOREIGN PATENT DOCUMENTS

| | | | |
|---|---|---|---|
| 0073288 | 3/1983 | European Pat. Off. | 123/385 |
| 0133451 | 8/1983 | Japan | 123/385 |
| 59-179250 | 11/1984 | Japan | 123/385 |
| 60-84330 | 11/1985 | Japan | 123/385 |

OTHER PUBLICATIONS

Japanese Patent Abstracts, vol. 7, No. 165, (JP-A-58-7-2-637), dated Jul. 20, 1983.
Japanese Patent Abstracts, vol. 10, No. 10, (JP-A-6-0-173-340), dated Jan. 16, 1986.
Japanese Patent Abstracts, vol. 4, No. 132, (JP-A-55-8-9-543), dated Sep. 17, 1980.
Japanese Patent Abstracts, vol. 9, No. 311, (JP-A-6-0-145-432), dated Dec. 7, 1985.
Japanese Patent Abstracts, vol. 8, No. 180, (JP-A-59-7-0-851), dated Aug. 18, 1984.
DE-A-3 526 603.
PCT/US83/01637, (U.S.S.N. 527,043).

Primary Examiner—Carl Stuart Miller
Attorney, Agent, or Firm—Welsh & Katz, Ltd.

[57] ABSTRACT

The present invention is concerned with an apparatus for controlling an engine mounted on a wheeled type construction machine. This engine controlling apparatus is adapted to set first and second torque performances conformable to a time of working of the wheeled type construction machine and a time of moving of the same and control an output torque of the engine in accordance with the aforesaid first and second torque performances at a time of working and a time of moving. Accordingly, by employing this controlling apparatus, working ability and moving ability of the wheeled type construction machine can be improved compared with conventional apparatuses which control the engine on the basis of a single kind of torque performance.

3 Claims, 3 Drawing Sheets

ENGINE CONTROLLING APPARATUS FOR A WHEELED TYPE CONSTRUCTION MACHINE

TECHNICAL FIELD

The present invention relates to an apparatus for controlling an engine mounted on a wheeled type construction machine and more particularly to an apparatus for controlling an output torque of the engine in accordance with a plurality of torque characteristics.

BACKGROUND ART

With respect to an engine mounted on a wheeled type construction machine, a high torque is required at a time of working and a high rotational speed is required at a time of moving.

However, when a rated output of the engine is taken into account, it is difficult to set an engine torque performance which can meet each of the aforesaid requirements. Heretofore, the aforesaid torque performance is established on the base of a compromise between the aforesaid requirements. For this reason, sufficient working performance and moving performance can not be given to the construction machine.

Incidentally, since an engine output is determined by torque and rotational speed of the engine, it follows that the aforesaid torque performance determines an engine output performance.

An object of the present invention is to provide an engine controlling apparatus which can impart sufficient working performance and moving performance to a wheeled type construction machine.

DISCLOSURE OF THE INVENTION

An engine controlling apparatus according to the present invention includes torque performance setting means for establishing first and second torque performances conformable to a time of working and a time of moving of a wheeled type construction machine as engine torque performance, discriminating means for discriminating whether the aforesaid wheeled type construction machine is kept in a working state or in a moving state, and controlling means for controlling the engine in accordance with the first torque performance when it is discriminated that the construction machine is kept in a working state and controlling the engine in accordance with the second torque performance when it is discriminated that the construction machine is kept in a moving state.

Since the engine controlling apparatus of the invention is constructed in the above-described manner, the first torque performance conformable to working and the second torque performance conformable to moving are set when a wheeled type construction machine carries out working and moving.

BEST MODE FOR CARRYING OUT THE INVENTION

Now, the present invention will be described in a greater detail hereunder with reference to the accompanying drawings.

Figure 1:
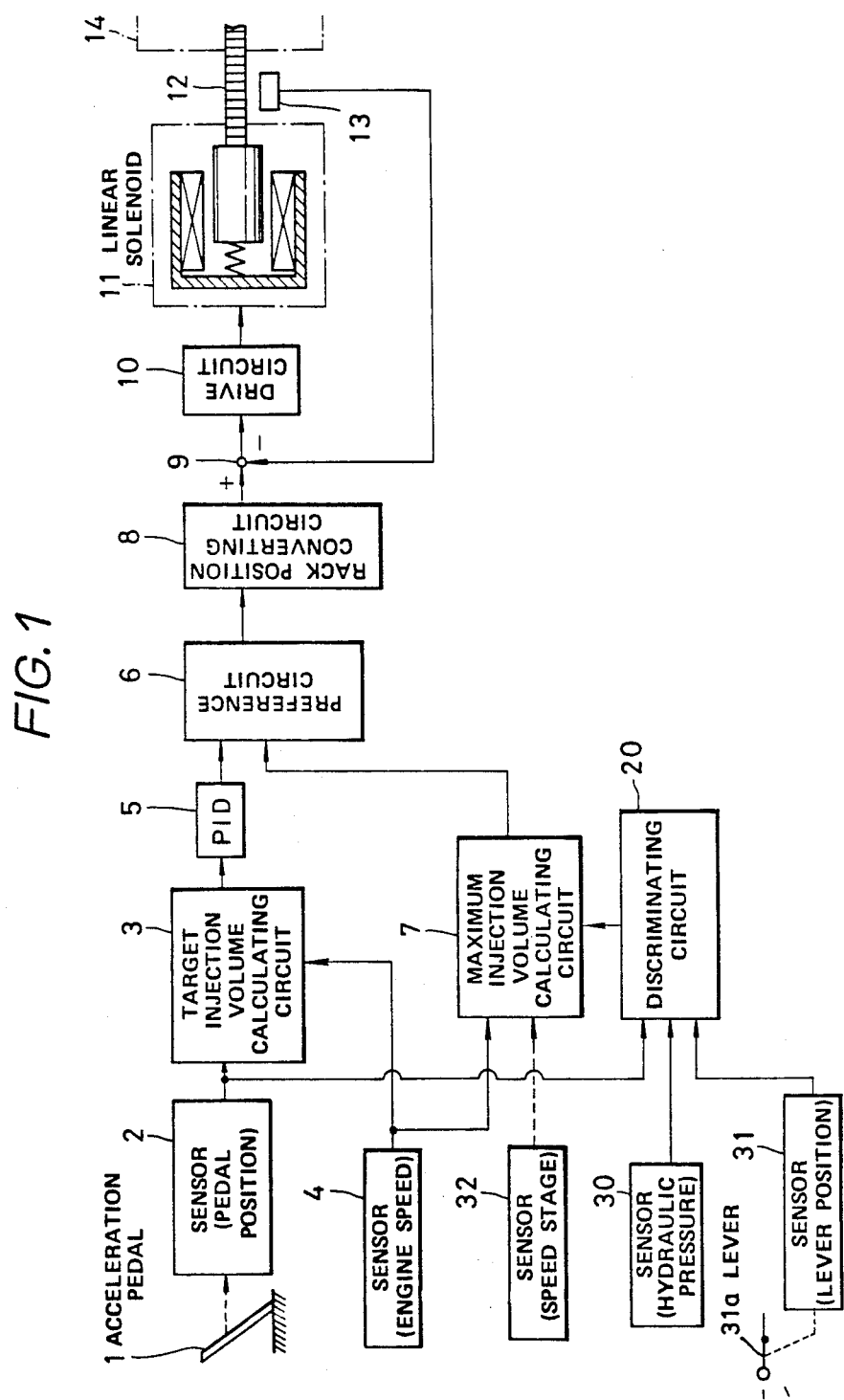
FIG. 1 is a block diagram illustrating an engine controlling apparatus in accordance with an embodiment of the present invention.

FIG. 1 illustrates by way of a block diagram an engine control apparatus for a wheeled type construction machine in accordance with an embodiment of the present invention.

In the drawing an acceleration pedal position detecting sensor 2 outputs a signal corresponding to the position of depressing of an acceleration pedal 1 (an amount of actuation), that is, a signal representative of a target engine rotational speed.

A target injection volume calculating circuit 3 calculates a target injection volume with reference to a signal indicative of a target engine rotational speed transmitted from the acceleration pedal position detecting sensor 2 and a rotational speed signal indicative of an actual rotational speed of the engine transmitted from an engine rotational speed sensor 4, and outputs a signal indicative of the target injection volume.

Figure 3:
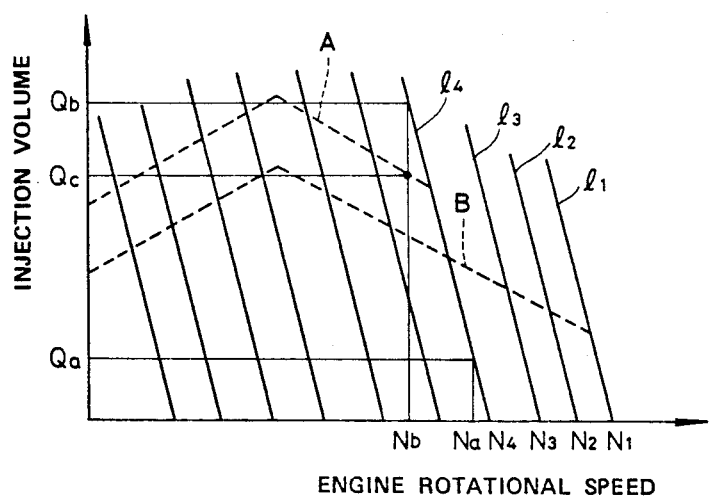
FIG. 3 is a graph for the purpose of explaining a function of a target injection volume calculating circuit.

Namely, this target injection volume calculating circuit 3 stores a plurality of regulation lines $l_1$, $l_2$,—as shown in FIG. 3 in a memory which is not shown in the drawing. An output from the aforesaid sensor 2 selects a required regulation line in response to the signal so that a target injection volume at the existent engine rotational speed is calculated with reference to the selected regulation line and an output signal from the aforesaid sensor 4.

For instance, in the case where a signal indicative of a target engine rotational speed $N_4$ is outputted from a sensor 2, a regulation line $l_4$ is selected. And, in the case where the actual engine rotational speed detected by the sensor 4 is $N_a$, a target injection volume $Q_a$ is calculated and in the case where the actual engine rotational speed detected by the sensor 4 is $N_b$, a target injection volume $Q_b$ is calculated.

Incidentally, for instance, in the case where the target rotational speed is intermediate between $N_3$ and $N_4$, a regulation line for the aforesaid intermediate target rotational speed is interpolated with reference to the regulation lines $l_3$ and $l_4$ for $N_3$ and $N_4$.

A signal indicative of the target injection volume calculated in that way is transmitted to a small signal preference circuit 6 via PID compensating circuit 5.

The small signal preference circuit 6 has another input into which a signal indicative of the maximum injection volume obtainable from a maximum injection volume calculating circuit 7 is introduced.

Figure 4:
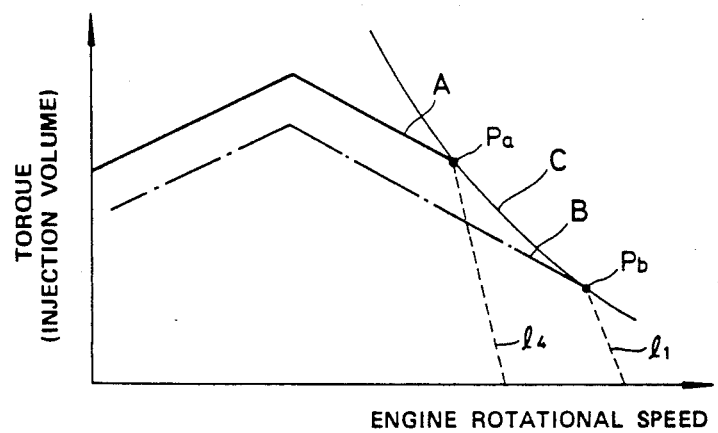
FIG. 4 is a graph for the purpose of explaining a function of a maximum injection volume calculating circuit.

The maximum injection volume calculating circuit 7 is such that, for instance, two kinds of allowable maximum torque characteristics A and B as shown in FIG. 4 are stored in a memory which is not shown in the drawing. It should be noted that since a torque of the engine is determined by a fuel injection volume, these characteristics A and B are practically indicative of an allowable maximum injection volume for individual engine rotational speed. Further, since an engine output is determined by a combination of the rotational speed and the torque of the engine, the aforesaid characteristics A and B become an element for determining the maximum output of the engine, respectively.

As is apparent from the fact that a torque value relative to the characteristic A is larger than that relative to the characteristic B, the characteristic A is so set that it conforms to the case where a high torque is required, that is, the case where a construction machine works. Further, as is apparent from the fact that the characteristic B extends to an area of an engine rotational speed higher than that of the characteristic A, the characteristic B is so set that it conforms to movement at a high speed.

The aforesaid maximum injection volume calculating circuit 7 selects either one of the aforesaid characteristics A and B in accordance with a selection signal transmitted from a discriminating circuit 20 which discriminates whether the wheeled type construction machine is kept in a working state or in a moving state at present. Then, a signal indicative of an engine rotational speed to be transmitted from the engine rotational speed sensor 4 and a signal indicative of an allowable maximum injection volume employable at the existent engine rotational speed with reference to the aforesaid selected characteristics are outputted. The discriminating circuit 20 will be described in more detail later.

The small signal preference circuit 6 compairs a signal indicative of a target injection volume to be outputted from the circuit 3 with a signal indicative of an allowable maximum injection volume to be outputted from the circuit 7 and then outputs the smaller one of the above-mentioned signals by preference.

Namely, for instance, in the case where the target injection volume $Q_a$ as shown in FIG. 3 is calculated with the use of the circuit 3 and the characteristic A is selected with the use of the circuit 7, a signal indicative of $Q_a$ is outputted from the small signal preference circuit 6. Further, in the case where the target injection volume $Q_b$ is calculated with the use of the circuit 3 and the characteristic A is selected with the use of the circuit 7, a signal indicative of the injection volume $Q_c$ is outputted from the small signal preference circuit 6 due to the fact that $Q_b$ is larger than the injection volume $Q_c$ on the characteristic A at the actual engine rotational speed $N_b$.

An output signal from the small signal preference circuit 6 is transmitted to a rack position conversion circuit 8. This rack position conversion circuit 8 converts an input signal indicative of a fuel injection volume into a signal indicative of a target position of a control rack 12 and this rack target position signal is transmitted to an addition point 9. Incidentally, this control rack 12 functions to vary a fuel injection volume of a fuel injection pump 14 in dependence on variation of the position of the control rack 12 as seen in the leftward and rightward directions.

The addition point 9 has another input into which a signal indicative of the position of the rack is introduced from a rack position sensor 13 as a feedback signal. Accordingly, a signal indicative of deviation of the aforesaid feedback signal from the aforesaid rack target position signal is outputted from this addition point 9 and this signal is transmitted to a linear solenoid 11 via a drive circuit 10. This causes the control rack 12 to be driven by the linear solenoid 11 in order that the position of the control rack 12 becomes a target position.

Figure 2:
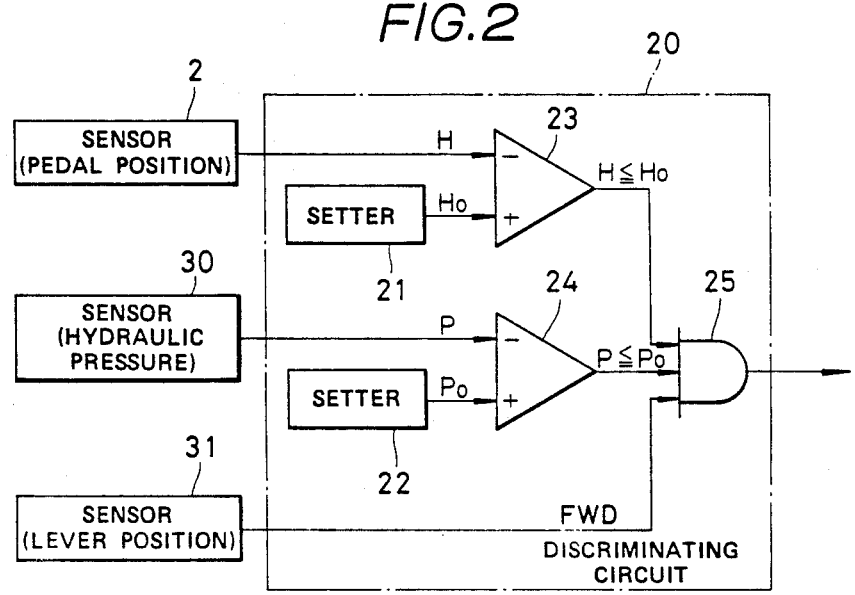
FIG. 2 is a block diagram illustrating an example of construction of a discriminating circuit.

Next, description will be made below in more details as to the aforesaid discriminating circuit 20 with reference to FIG. 2 and moreover description will be made as to a function of the illustrated embodiment. It is discriminated in this discriminating circuits 20 with reference to detected signals of the acceleration pedal position detecting sensor 2, a hydraulic pressure detecting sensor 30 and a forward and rearward movement lever position detecting sensor 31 whether the wheeled type construction machine is kept in a working state or in a moving state.

As described above, the acceleration pedal position detecting sensor 2 outputs a signal H indicative of the position of depression of the acceleration pedal 1 (a height of the pedal) Incidentally, the output signal H in this embodiment represents a value in inverse proportion to the extent of depression of the acceleration pedal 1. The hydraulic pressure detecting sensor 30 is disposed in a hydraulic circuit for driving a working portion of the construction machine to output a signal P indicative of hydraulic pressure in the hydraulic circuit. The forward and rearward movement lever position detecting sensor 31 outputs a signal FWD ("1") when a lever $31_a$ for selecting the forward movement or the rearward movement of the construction machine assumes a position indicative of the forward movement thereof.

The discriminating circuit 20 is composed of setting devices 21 and 22, comparators 23 and 24 and an AND circuit 25. The setting device 21 outputs a setting signal H for discriminating whether or not the acceleration pedal 1 is depressed to an extent more than predetermined one and the setting device 22 outputs a setting signal $P_o$ for discriminating whether or not hydraulic pressure in the hydraulic circuit of the working section is kept at a pressure applied during working.

The comparator 23 makes a comparison between input signals H and $H_o$ and outputs a signal "1" when a formula of $H \leq H_o$ is established, that is, when the acceleration pedal 1 is depressed to an extent more than predetermined one. The comparator 24 makes a comparison between input signals P and $P_o$ and then outputs a signal "1" when a formula of $P = P_o$, that is, when hydraulic pressure in the hydraulic circuit in the working section does not reach a pressure applied during working.

The AND circuit 25 takes AND conditions relative to a signal transmitted from the forward and rearward movement lever position detecting sensor 30, and when the AND conditions are established, a signal "1" indicative of the fact that the construction machine is kept in a moving state is transmitted to the maximum injection volume calculating circuit 7, while when the AND conditions fail to be established, a signal "0" indicative of the fact that the construction machine is kept at a working state is transmitted to the maximum injection volume calculating circuit 7.

The maximum injection volume calculating circuit 7 selects an injection volume characteristic B (see FIG. 4) conformable to moving when a signal "1" is transmitted from the aforesaid discriminating circuit 20 and selects an injection volume characteristic A conformable to working.

When either one of the characteristics A and B shown in FIG. 4 is selected by the circuit 7 and either one of lines $l_1, l_2$,—shown in FIG. 3 is selected by the circuit 3, a torque characteristic of the engine is determined. Accordingly, in this embodiment the circuits 3 and 7 function as an element for determining the torque characteristic of the engine.

Since the engine controlling apparatus in accordance with the present embodiment functions in the above-described manner, a high engine torque on the basis of the characteristic A can be obtained when the construction machine works. Further, when the construction machine moves, a rotational speed of the engine can be increased on the basis of the characteristic B. That is to say, the construction machine can move at a high speed.

It should be noted that a point $P_a$ on the characteristic A and a point $P_b$ on the characteristic B shown in FIG. 4 are located on a rated engine horse power curve C of the engine, respectively. Accordingly, output horse powers of the engine each generated when the operating point of the engine is located on a point $P_a$ and a point $P_b$ become identical to each other.

Figure 5:
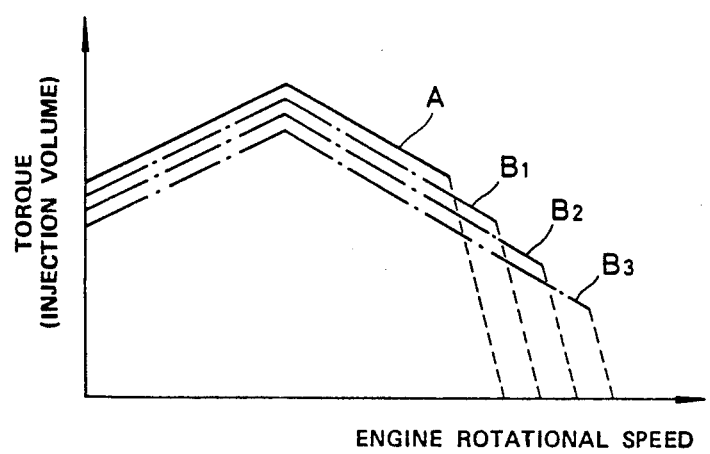
FIG. 5 is a graph illustrating other example of setting a torque performance.

In the above-described embodiment two torque characteristics A and B are set, but many torque characteristics, for instance, four kinds of torque characteristics A, $B_1$, $B_2$ and $B_3$ as shown in FIG. 5 can be set. In this case, the existent speed stage is detected with the aid of speed stage detecting means 32 and a speed stage conformable to the speed stage detected by either one of the characteristics $B_1$, $B_2$ and $B_3$ is selected in the circuit 7. Incidentally, in this case, an output from the aforesaid discriminating circuit 20 is utilized for the purpose of selecting the characteristics A and the characteristics ($B_1$, $B_2$ and $B_3$).

In the above-described embodiment it is discriminated with reference to each detected output of the acceleration pedal position detecting sensor 2, the hydraulic pressure detecting sensor 30 and the forward and rearward movement lever position detecting sensor 31 whether the wheeled type construction machine is kept in a working state or in a moving state, but kind and combination of the detecting sensors should not be limited to this. The above-described discrimination can be achieved, for instance, by using a vehicle speed sensor or the like.

INDUSTRIAL APPLICABILITY

According to the present invention, an output torque of an engine is controlled in accordance with each torque characteristic conformable to working and moving when a wheeled type construction machine carries out working and moving. Accordingly, the working performance and the moving performance of the aforesaid wheeled type construction machine can be improved remarkably.

We claim:

1. An engine controlling apparatus for a wheeled construction machine adapted to control an engine in such a manner as to generate a torque in accordance with a predetermined torque performance with reference to an extent of actuation of an acceleration pedal and a rotational speed of the engine, characterized in that said apparatus comprises, torque performance setting means for setting first and second torque performances conformable to a time of working and a time of moving of the wheeled type construction machine as a torque performance, discriminating means including first detecting means for detecting that hydraulic pressure in a hydraulic circuit for driving a working section of said construction machine is lower than a preset one, second detecting means for detecting that an extent of actuation of an acceleration pedal is more than said preset one, third detecting means for detecting that means for commanding forward movement and rearward movement of the construction machine commands forward movement of the latter and a logical circuit adapted to take a logical sum of detected outputs of said first, second, and third detecting means, said discriminating means for discriminating on the basis of the output of the logical circuit whether the wheeled type construction machine is kept in a working state or in a moving state, and means for controlling the engine in accordance with said first torque performance when it is discriminated by the discriminating means that the construction machine is kept in a working state and controlling the engine in accordance with said second torque performance when it is discriminated by the discriminating means that the construction machine is kept in a moving state.

2. An engine controlling apparatus for a wheeled type construction machine as claimed in claim 1, characterized in that said torque performance setting means includes means for detecting a speed stage of a transmission and it is adapted to set a performance conformable to each speed stage of said transmission as said second torque performance.

3. An engine controlling apparatus for a wheeled construction machine according to claim 1, said machine having maximum power points Pa and Pb, respectively, of said first and sais second torque performances, wherein said first and said second torque performances are set such that said maximum power points Pa and Pb exist on a rated horse power curve C.

* * * * *